US012754122B2

(12) United States Patent
Nam

(10) Patent No.: US 12,754,122 B2
(45) Date of Patent: Oct. 6, 2026

(54) SENSOR SYSTEM AND ELECTRONIC APPARATUS INCLUDING THE SAME

(71) Applicant: SAMSUNG ELECTRONICS CO., LTD., Suwon-si (KR)

(72) Inventor: Sunghyun Nam, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 85 days.

(21) Appl. No.: 19/013,662

(22) Filed: Jan. 8, 2025

(65) Prior Publication Data

US 2025/0237592 A1 Jul. 24, 2025

(30) Foreign Application Priority Data

Jan. 22, 2024 (KR) ........................ 10-2024-0009788

(51) Int. Cl.
*G01N 15/075* (2024.01)
*G01N 15/00* (2006.01)

(52) U.S. Cl.
CPC ....... *G01N 15/075* (2024.01); *G01N 2015/03* (2013.01)

(58) Field of Classification Search
CPC ............. G01N 15/075; G01N 2015/03; G01N 33/0031; G01N 33/0004; G01N 21/25; G01N 33/0006; G01N 33/0011
See application file for complete search history.

(56) References Cited

U.S. PATENT DOCUMENTS 5,570,179 A * 10/1996 Weckstrom ............ G01N 21/69 356/417
6,088,096 A * 7/2000 Aoki ................. H01J 37/32935 356/310
2013/0211207 A1 8/2013 Joseph et al.

FOREIGN PATENT DOCUMENTS

CN 108072623 A 5/2018
CN 209167130 U 7/2019
CN 113588732 A 11/2021
CN 112129893 B 9/2022

* cited by examiner

*Primary Examiner* — Tony Ko
(74) *Attorney, Agent, or Firm* — Sughrue Mion, PLLC

(57) ABSTRACT

A sensor system includes a first sensor array including a plurality of first sensors having different sensitivities with respect to components of a gas mixture, and a second sensor including a plurality of electrodes configured to emit light, an optical lens configured to collimate the light, and a spectroscope, where the second sensor is configured to generate a prediction value corresponding to the components of the gas mixture.

20 Claims, 5 Drawing Sheets

SENSOR SYSTEM AND ELECTRONIC APPARATUS INCLUDING THE SAME

CROSS-REFERENCE TO RELATED APPLICATION

This application is based on and claims priority to Korean Patent Application No. 10-2024-0009788, filed on Jan. 22, 2024, in the Korean Intellectual Property Office, the disclosure of which is incorporated herein by reference in its entirety.

BACKGROUND

1. Field

The disclosure relates to a sensor system and an electronic device including the same.

2. Description of Related Art

Olfactory sensors are an element of an electronic nose (e-nose) that may detect gases or volatile compounds and quantitatively measure the type and concentration of gases or volatile compounds. An olfactory sensor generally detects gases or volatile compounds by using a single sensor or a sensor array.

The olfactory sensor has limitations such as sensor output drift and sensitivity changes due to environmental changes and sensor deterioration, as well as insufficient selectivity for gas molecules of the sensor.

SUMMARY

Provided are a sensor system with high selectivity and accuracy and an electronic device including the sensor system.

Additional aspects will be set forth in part in the description which follows and, in part, will be apparent from the description, or may be learned by practice of the presented embodiments of the disclosure.

According to an aspect of the disclosure, a sensor system may include a first sensor array including a plurality of first sensors having different sensitivities with respect to components of a gas mixture, and a second sensor including a plurality of electrodes configured to emit light, an optical lens configured to collimate the light, and a spectroscope, where the second sensor is configured to generate a prediction value corresponding to the components of the gas mixture.

The sensor system may include a first chamber and a second chamber, the first sensor array may be in the first chamber, the plurality of electrodes may be in the second chamber, and the first chamber may be connected in series to the second chamber.

The sensor system may include a first chamber and a second chamber, the first sensor array may be in the first chamber, the plurality of electrodes may be in the second chamber, and the first chamber may be connected in parallel to the second chamber.

The sensor system may include a first chamber, and the first sensor array and the plurality of electrodes May be provided in the first chamber.

The sensor system may include a nanogap between the plurality of electrodes.

The spectroscope may include a plurality of pixels and a filter provided on the plurality of pixels.

The plurality of pixels may include a complementary metal-oxide-semiconductor (CMOS) image sensor or a line array sensor.

The filter may include a band pass filter.

The sensor system may include a concentrator configured to concentrate the gas mixture.

The sensor system may include a circuit portion configured to output analog signals of the first sensor array and the second sensor and convert the analog signals into digital signals.

The prediction value may correspond to a type and concentration of the components of the gas mixture, the second sensor may be configured to transmit the prediction value to the first sensor array, and the first sensor array may be configured to be recalibrated based on the prediction value.

The sensor system may include a controller configured to recalibrate the first sensor array based on the prediction value.

The controller may be configured to recalibrate the first sensor array by at least one of adjusting a sensitivity and offset value of each of the plurality of first sensors, and updating a library of the components of the gas mixture.

According to an aspect of the disclosure, a sensor system may include a first chamber, a second chamber, a first sensor array including a plurality of first sensors having different sensitivities with respect to components of a gas mixture, and a second sensor including a first electrode in the second chamber, a second electrode outside the second chamber, and a spectroscope, where the second sensor is configured to generate a prediction value corresponding to the components of the gas mixture, and where the first sensor array is configured to be recalibrated based on the prediction value.

The first sensor array may be in the first chamber, and the first chamber may be connected in series to the second chamber.

The first sensor array may be in the first chamber, and the first chamber may be connected in parallel to the second chamber.

The prediction value may correspond to a type and concentration of the components of the gas mixture, and the second sensor may be configured to transmit the prediction value to the first sensor array such that the first sensor array is recalibrated based on the transmitted prediction value.

The sensor system may include a controller configured to recalibrate the first sensor array based on the prediction value by at least one of adjusting a sensitivity and offset value of each of the plurality of first sensors, and updating a library of the components of the gas mixture.

The sensor system may include a concentrator configured to concentrate the gas mixture.

According to an aspect of the disclosure, a method of operating a sensor system including a first chamber in which a first sensor array is provided and a second chamber in which a second sensor is provided, may include injecting a gas mixture into the second chamber, generating light by applying a voltage to electrodes of the second sensor, generating a prediction value corresponding to components and concentration of the gas mixture by measuring a spectrum of the generated light, and recalibrating the first sensor array based on the generated prediction value.

The method may include transmitting, from the second sensor, the prediction value to the first sensor array.

The method may include collimating the generated light to be incident on a spectroscope of the second sensor, where the spectrum is measured using the spectroscope.

The method may include, prior to generating the light, concentrating the gas mixture with a concentrator.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
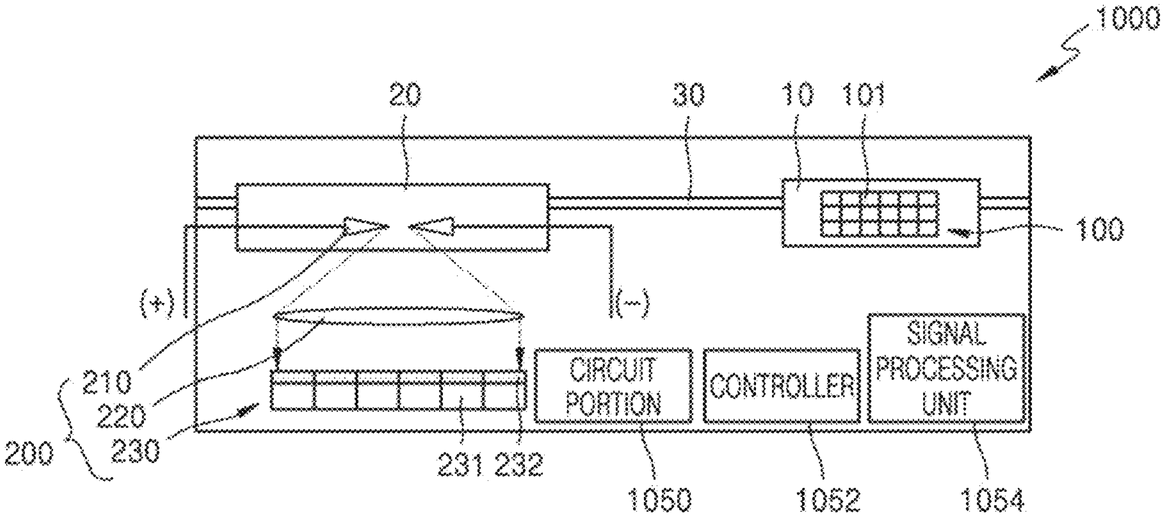
FIG. 1 is a diagram illustrating a structure of a sensor system according to one or more embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, a sensor system and an electronic device including the same are described in detail with reference to the accompanying drawings. The embodiments described below are merely exemplary, and various modifications are possible from these embodiments. In the following drawings, the same reference numerals refer to the same components, and the size of each component in the drawings may be exaggerated for clarity and convenience of description.

In the following description, when a component is referred to as being "above" or "on" another component, it may be directly on an upper, lower, left, or right side of the other component while making contact with the other component or may be above an upper, lower, left, or right side of the other component without making contact with the other component.

The terms of a singular form may include plural forms unless otherwise specified. In addition, when a certain part "includes" a certain component, it means that other components may be further included rather than excluding other components unless otherwise stated. Furthermore, it will be further understood that the terms "comprises" and/or "comprising" used herein specify the presence of stated features or components, but do not preclude the presence or addition of one or more other features or components.

Terms such as first, second, etc. may be used to describe various components, but are used only for the purpose of distinguishing one component from another component. These terms do not limit the difference in the material or structure of the components The use of the term "the" and similar designating terms may correspond to both the singular and the plural.

Operations of a method may be performed in an appropriate order unless explicitly described in terms of order. In addition, the use of all illustrative terms (e.g., etc.) is merely for describing technical ideas in detail, and the scope is not limited by these examples or illustrative terms unless limited by the claims.

In addition, terms such as "unit" and "module" described in the specification may indicate a unit that processes at least one function or operation, and this may be implemented as hardware or software, or may be implemented as a combination of hardware and software.

Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The use of any and all examples, or language (e.g., "such as") provided herein, is intended merely to better illuminate the disclosure and does not pose a limitation on the scope of the disclosure unless otherwise claimed.

FIG. 1 is a diagram illustrating a structure of a sensor system 1000 according to one or more embodiments.

Referring to FIG. 1, the sensor system 1000 may include a first sensor array 100 including a plurality of first sensors 101 and a second sensor 200 that obtains information for calibration/control of the first sensor array 100.

Each of the first sensors 101 may have a different sensitivity to components of a gas mixture to be measured.

The first sensor array 100 may be calibrated or controlled based on information obtained by the second sensor 200. A controller may recalibrate the first sensor array 100 based on information obtained by the second sensor 200. The recalibration may refer to an adjustment of a sensitivity and offset value of each of the first sensors 101 constituting the first sensor array 100 and an update of a library of components of a gas mixture. As the sensitivity and offset value of the first sensors 101 and the library of the components of a gas mixture may vary over time, through a recalibration task, the sensitivity and offset value of the first sensors 101 and the library of the components of a gas mixture may be updated, and thus, accuracy of a value output the first sensor array 100 is improved.

The first sensor array 100 may be provided within a first chamber 10. However, embodiments are not limited thereto, and the first sensor array 100 may be provided within a second chamber 20. The first chamber 10 may be connected to the second chamber 20 through a pipe 30. The gas mixture introduced into the second chamber 20 may be transmitted to the first chamber 10 through the pipe 30. That is, the first chamber 10 and the second chamber 20 may be connected in series. In one or more embodiments, the first chamber 10 and the second chamber 20 may be connected in parallel (e.g., FIG. 3).

The second sensor 200 may include a plurality of electrodes 210 that emit light, an optical lens 220 that collimates light, and a spectroscope 230.

A nanogap may be formed between the electrodes 210. When a high voltage is applied to the electrodes 210 having a nanogap, light may be generated by glow discharge. The generated light may show unique spectral characteristics of a material constituting the gas mixture to be measured.

The electrodes 210 may include a conductive material, such as gold, silver, copper, or conductive polymer. However, embodiments are not limited thereto.

The light generated from a small volume between the nanogap is collimated by using the optical lens 220 and may be made incident on the spectroscope 230. The spectroscope 230 may include a plurality of pixels 231 and a filter 232 on the pixels 231. The pixels 231 may include, for example, a complementary metal-oxide-semiconductor (CMOS) image sensor or a line array sensor. The filter 232 may include, for example, a band pass filter. By integrating the filter 232 on top of the pixels 231 together, a spectrum may be measured in a manner that only transmits wavelengths within a desired band.

The electrodes 210 may be provided within the second chamber 20. Although FIG. 1 illustrates that the first sensor array 100 and the electrodes 210 are provided in different chambers, embodiments are not limited thereto, and the first sensor array 100 and the electrodes 210 may be provided in the same chamber. For example, both of the first sensor array 100 and the electrodes 210 may be provided in the second chamber 20.

The second sensor 200 may be a sensor that has high measurement accuracy while operating at a relatively low frequency. The second sensor 200 may predict the components and concentration of a gas mixture to be measured more accurately than the first sensor array 100. Furthermore, as the second sensor 200 may be miniaturized, the second sensor 200 may be integrated or packaged with the first sensor array 100.

The second sensor 200 may measure the components of a gas mixture to be measured and obtain information for calibration or control of the first sensor array 100. The second sensor 200 may concentrate the gas mixture to be measured for a predetermined period of time and then perform measurement based on a measurement start signal to predict the types of components of the gas mixture and the concentration of each component. The prediction value is transmitted to the first sensor array 100. The recalibration of the first sensor array 100 may be performed based on the prediction value.

The sensor system 1000 may further include a circuit portion 1050 that outputs analog signals of the first sensor array 100 and the second sensor 200 and converts the output analog signals into digital signals, a controller 1052 configured to control functions of elements and perform communication with the outside, and a signal processing unit 1054 that operates algorithms to identify a gas mixture from sensor signals and predict a concentration thereof.

The controller 1052 may request calibration or recalibration of the first sensor array 100. While monitoring a signal output of the first sensor array 100, the controller 1052 may determine whether to calibrate or recalibrate the first sensor array 100 when detecting an abnormal signal or when a predetermined time passes after a previous recalibration of the first sensor array 100. The detecting of an abnormal signal may refer to, for example, a case of exceeding a signal drift threshold value, a change in a predicted component of a gas mixture, or exceeding a threshold value of a concentration change. Although not shown in FIGS. 2 and 3, the sensor systems 1001 and 1002 may also include a circuit portion 1050, a controller 1052 and a signal processing unit 1054.

The sensor system 1000 according to one or more embodiments may increase selectivity and accuracy to a target gas by performing recalibration on the first sensor array 100 based on information obtained by the second sensor 200.

Figure 2:
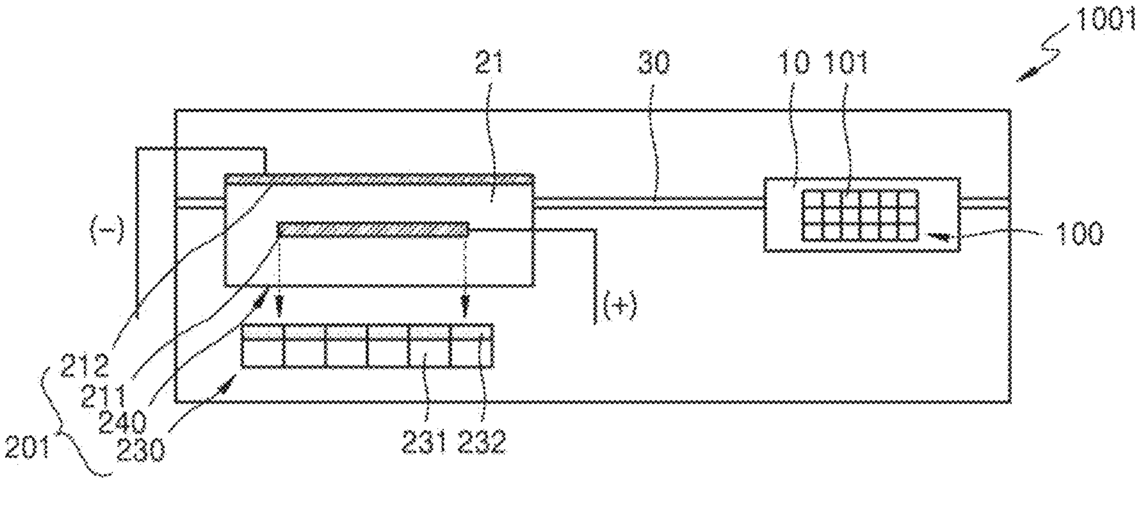
FIG. 2 is a diagram illustrating a structure of a sensor system according to one or more embodiments.

FIG. 2 is a diagram illustrating a structure of a sensor system 1001 according to one or more embodiments. The sensor system 1001 of FIG. 2 may be the same as or similar to the sensor system 1000 of FIG. 1, except for the structure of the second sensor 201. Therefore, repeated description of similar elements may be omitted.

Referring to FIG. 2, the sensor system 1001 may include a first sensor array 100 including first sensors 101 and a second sensor 201 that calibrates the first sensor array 100.

The second sensor 201 may include a first electrode 211 provided within a second chamber 21, a second electrode 212 provided outside the second chamber 21, and a spectroscope 230. A slit 240 may be formed in the second chamber 21.

The first electrode 211 may be provided within the second chamber 21 and may have a cylindrical shape. The second electrode 212 may be provided on an outer surface of the second chamber 21. When a high voltage is applied to the first electrode 211 and the second electrode 212, light may be generated by glow discharge. The generated light may show unique spectral characteristics of a material constituting the gas mixture to be measured.

The second chamber 21 may have a capillary structure. The second chamber 21 may have a cylindrical structure. The slit 240 may be formed in a partial area of the second chamber 21. The light may exit the second chamber 21 through the slit 240. The light generated by glow discharge may be incident on the spectroscope 230 through the slit 240.

The spectroscope 230 may include the pixels 231 and the filter 232 provided on the pixels 231. Each of the pixels 231 may include, for example, a CMOS image sensor or a line array sensor. The filter 232 may include, for example, a band pass filter. By integrating the filter 232 on top of the pixels 231 together, spectrum may be measured in a manner that transmits only a wavelength of a desired band.

Figure 3:
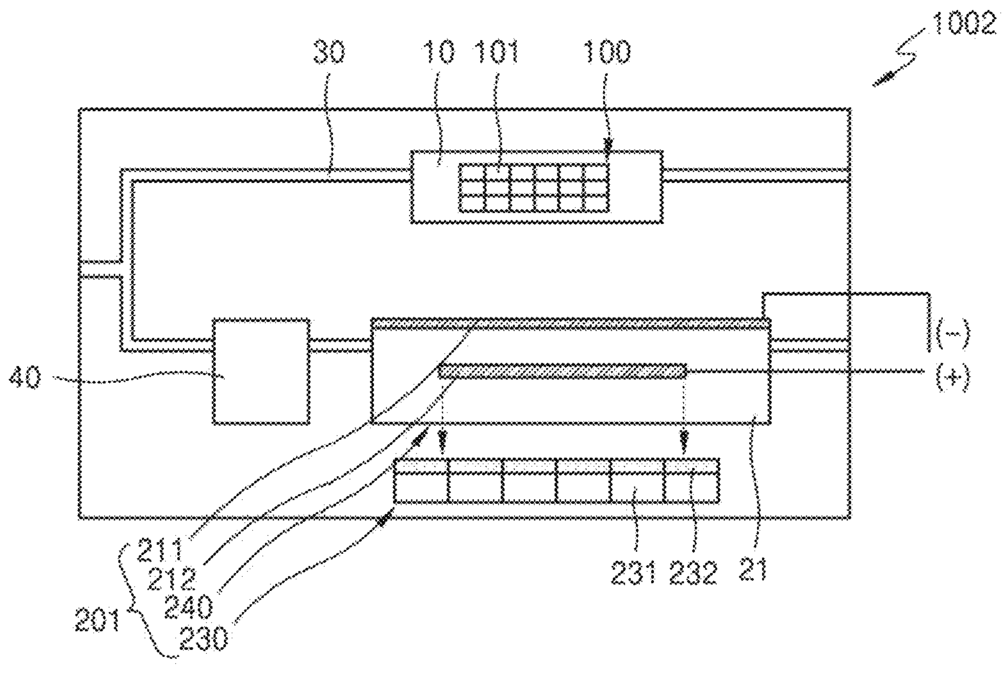
FIG. 3 is a diagram illustrating a structure of a sensor system according to one or more embodiments.

FIG. 3 is a diagram illustrating a structure of a sensor system 1002 according to one or more embodiments. The sensor system 1002 of FIG. 3 may be the same as or similar to the sensor system 1001 of FIG. 2, except that the sensor system 1002 further includes the concentrator 40 and the first chamber 10 and the second chamber 21 are connected in parallel to each other. Therefore, repeated description of similar elements may be omitted.

Referring to FIG. 3, the sensor system 1002 may include a first sensor array 100 including a first sensors 101 and a second sensor 201 that calibrates the first sensor array 100.

The second sensor 201 may be configured to operate intermittently. The sensor system 1002 may further include a concentrator 40 that concentrates a gas mixture to be measured when the second sensor 201 is not in operation. The gas mixture may be introduced into the second chamber 21 after being concentrated through the concentrator 40.

The first chamber 10 and the second chamber 21 may be connected in parallel to each other.

The sensor system 1002 according to one or more embodiments may have increased measurement accuracy by concentrating the gas mixture through the concentrator 40.

Figure 4:
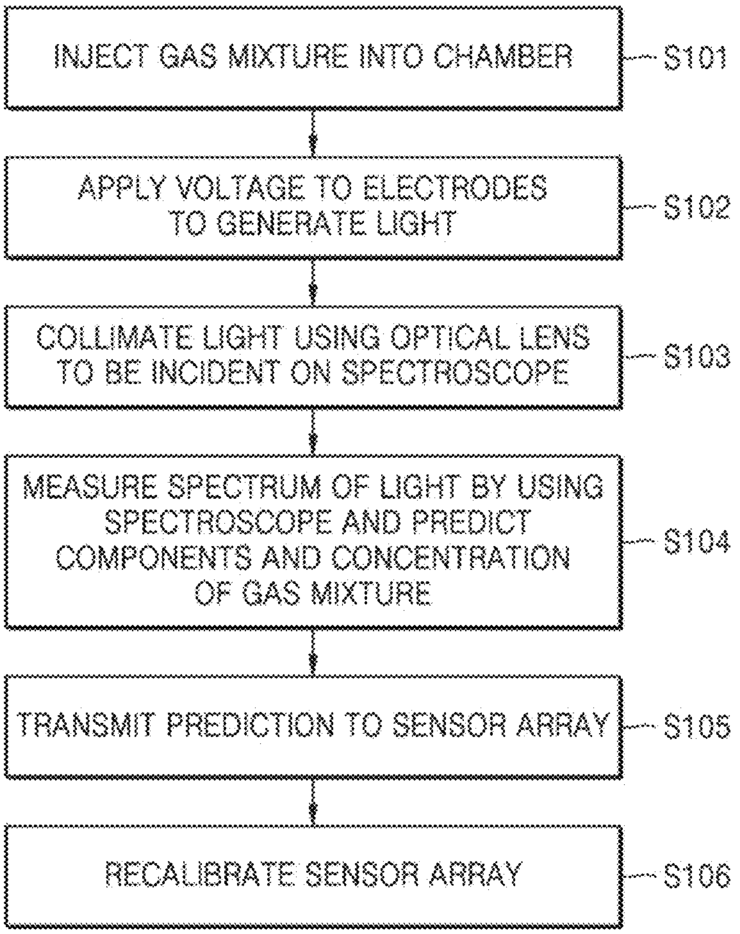
FIG. 4 is a flowchart of a method of operating a sensor system, according to one or more embodiments.

FIG. 4 is a flowchart of a method of operating a sensor system, according to one or more embodiments.

Referring to FIG. 4, a gas mixture may be injected into a chamber in operation S101. Before the injecting of the gas mixture into the chamber, moisture of the gas mixture may be removed, and the gas mixture may be concentrated. The accuracy of the sensor system may be increased through the removing of the moisture from the gas mixture and the concentrating of the gas mixture. The electrodes may be provided within the chamber. The first sensor array may be provided within the chamber.

As a voltage is applied to the electrodes, light may be generated in operation S102. The generated light may show unique spectral characteristics of a material constituting the gas mixture to be measured. When a plurality of electrodes are provided in the chamber and a high voltage is applied to the plurality of electrodes in the chamber, light may be generated by glow discharge. However, embodiments are not limited thereto, and light may be generated through an electrode provided within the chamber and an electrode provided outside the chamber.

The generated light may be collimated by using an optical lens to be incident on a spectroscope in operation S103. However, embodiments are not limited thereto, and the generated light may be incident on the spectroscope through a slit of the chamber. The spectroscope may include a plurality of pixels and a filter provided on the plurality of pixels. The pixels may include, for example, a CMOS image sensor or a line array sensor. The filter may include, for example, a band pass filter. By integrating the filter on top of the pixels together, spectrum may be measured in a manner that transmits only a wavelength of a desired band.

By measuring a spectrum of light by using the spectroscope, the components and concentration of the gas mixture may be predicted in operation S104. That is, the second sensor may measure the spectrum of light and then predict the components and concentration of the gas mixture.

A prediction value of the components and concentration of the gas mixture may be transmitted to a first sensor array in operation S105. That is, the second sensor may predict components and concentration of a gas mixture, and then transmit the prediction value to the first sensor array.

The first sensor array may recalibrated based on the predicted value in operation S106. The first sensor array may be recalibrated based on the prediction value transmitted from a second sensor. In other words, the sensitivity and offset values of a plurality of first sensors constituting the first sensor array may be adjusted and the library of the components of the gas mixture may be updated.

In some embodiments, the first sensor array may be implemented with a neural network or other type of machine learning processing. For example, the second sensor may obtain training data (e.g., the information obtained by the second sensor as described herein), and then transmit the training data to the first sensor array or another component that is configured to receive the training data and train the first sensor array to function or recalibrate based on the received training data. That is, the first sensor array may be implemented with or connected to a neural network processor that includes at least one neural network that may be trained based on data obtained by the second sensor, such that the operations of the first sensor array may be calibrated/updated dynamically according to changes in system parameters.

Figure 5:
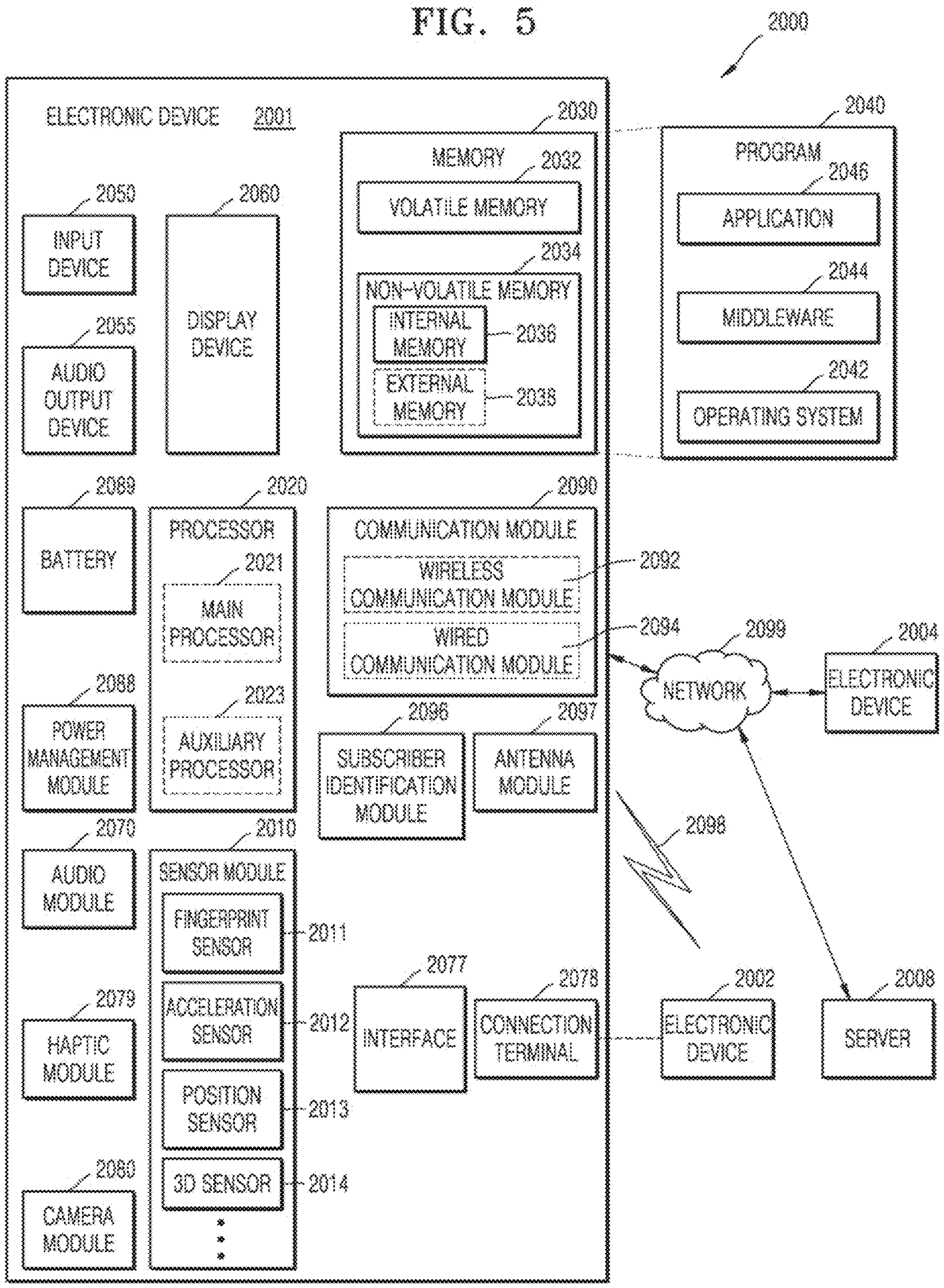
FIG. 5 is a block diagram illustrating a configuration of an electronic device according to one or more embodiments.

FIG. 5 is a block diagram illustrating a configuration of an electronic device 2001 according to one or more embodiments.

Referring to FIG. 5, in a network environment 2000, the electronic device 2001 may communicate with an electronic device 2002 through a first network 2098 (e.g., a short-range wireless communication network, etc.), or another electronic device 2004 and/or a server 2008 through a second network 2099 (e.g., a long-range wireless communication network, etc.). The electronic device 2001 may communicate with the electronic device 2004 through the server 2008. The electronic device 2001 may include a processor 2020, a memory 2030, an input device 2050, an audio output device 2055, a display device 2060, an audio module 2070, a sensor module 2010, an interface 2077, a haptic module 2079, a camera module 2080, a power management module 2088, a battery 2089, a communication module 2090, a subscriber identification module 2096, and/or an antenna module 2097. In the electronic device 2001, some (e.g., the display device 2060, etc.) of the components may be omitted, or other components may be added. Some of the components may be implemented as one integrated circuit. For example, a fingerprint sensor 2011, an iris sensor, an illuminance sensor or the like of the sensor module 2010 may be implemented by being embedded in the display device 2060 (e.g., a display, etc.).

The processor 2020 may control, by executing software (e.g., a program 2040, etc.), one or a plurality of other components (e.g., a hardware component, a software component, etc.) of the electronic device 2001 connected to the processor 2020, and may perform various data processing or operations. As part of the data processing or operations, the processor 2020 may load command and/or data received from other components (e.g., the sensor module 2010, the communication module 2090, etc.) on a volatile memory 2032, process the command and/or data stored in the volatile memory 2032, and store resultant data on a non-volatile memory 2034. The processor 2020 may include a main processor 2021 (e.g., a central processing unit, an application processor, etc.) and an auxiliary processor 2023 (e.g., a graphics processing device, an image signal processor, a sensor hub processor, a communication processor, etc.) that may be operated independently or together. The auxiliary processor 2023 may consume less power than the main processor 2021 and may perform a specialized function.

The auxiliary processor 2023 may control functions and/or states related to some constituent elements (e.g., the display device 2060, the sensor module 2010, the communication module 2090, etc.) of the electronic device 2001, instead of the main processor 2021 when the main processor 2021 is in an inactive state (e.g., a sleep state), or with the main processor 2021 when the main processor 2021 is in an active state (e.g., an application execution state). The auxiliary processor 2023 (e.g., an image signal processor, a communication processor, etc.) may be implemented as a part of functionally related other constituent elements (e.g., the camera module 2080, the communication module 2090, etc.).

The memory 2030 may store various pieces of data needed for constituent element (e.g., the processor 2020, the sensor module 2010, etc.) of the electronic device 2001. The data may include, for example, software (e.g., the program 2040, etc.) and input data and/or output data regarding commands related thereto. The memory 2030 may include the volatile memory 2032 and/or the non-volatile memory 2034. The non-volatile memory 2034 may include an internal memory 2036 and an external memory 2038.

The program 2040 may be stored as software in the memory 2030, and may include an operating system 2042, a middleware 2044, and/or an application 2046.

The input device 2050 may receive commands and/or data to be used in the constituent elements (e.g., the processor 2020 etc.) of the electronic device 2001, from the outside (e.g., a user etc.) of the electronic device 2001. The input device 2050 may include a microphone, a mouse, a keyboard, and/or a digital pen (e.g., a stylus pen etc.).

The audio output device 2055 may output an audio signal to the outside of the electronic device 2001. The audio output device 2055 may include a speaker and/or a receiver. The speaker may be used for general purposes such as multimedia playback or recording playback, and the receiver may be used to receive incoming calls. The receiver may be combined as a part of the speaker or implemented as an independent separate device.

The display device 2060 may visually provide information to the outside of the electronic device 2001. The display device 2060 may include a display, a hologram device, or a projector, and a control circuit for controlling such a device. The display device 2060 may include a touch circuitry set to sense a touch, and/or a sensor circuit (e.g., a pressure sensor etc.) set to measure the strength of a force generated by the touch.

The audio module 2070 may convert sound into an electrical signal or reversely an electrical signal into sound. The audio module 2070 may obtain sound through the input device 2050, or output sound through the audio output device 2055 and/or a speaker and/or a headphone of another electronic device (e.g., the electronic device 2002 etc.) connected to the electronic device 2001 in a wired or wireless manner.

The sensor module 2010 may sense an operation state (e.g., power, a temperature, etc.) of the electronic device 2001, or an external environment state (e.g., a user state etc.), and generate an electrical signal and/or data value corresponding to a sensed state. The sensor module 2010 may include the fingerprint sensor 2011, an acceleration sensor 2012, a position sensor 2013, a three-dimensional (3D) sensor 2014, and the like, and further include an iris sensor, a gyro sensor, a barometric pressure sensor, a magnetic sensor, a grip sensor, a proximity sensor, a color sensor, an infrared (IR) sensor, a biometric sensor, a temperature sensor, a humidity sensor, and/or an illuminance sensor. The sensor module 2010 may include the sensor systems 1000, 1001, and 1002 of FIGS. 1 to 3.

The interface 2077 may support one or more designated protocols to be used for connecting the electronic device 2001 to another electronic device (e.g., the electronic device 2002 etc.) in a wired or wireless manner. The interface 2077 may include a high definition multimedia interface (HDMI), a universal serial bus (USB) interface, a secure digital (SD) card interface, and/or an audio interface.

A connection terminal 2078 may include a connector for physically connecting the electronic device 2001 to another electronic device (e.g., the electronic device 2002 etc.). The connection terminal 2078 may include an HDMI connector, a USB connector, an SD card connector, and/or an audio connector (e.g., a headphone connector etc.).

The haptic module 2079 may convert electrical signals into mechanical stimuli (e.g., vibrations, movements, etc.) or electrical stimuli that are perceivable by a user through tactile or motor sensations. The haptic module 2079 may include a motor, a piezoelectric device, and/or an electrical stimulation device.

The camera module 2080 may capture a still image and a video. The camera module 2080 may include a lens assembly including one or a plurality of lenses, image sensors, image signal processors, and/or flashes. The lens assembly included in the camera module 2080 may collect light emitted from an object that is a target for image capturing, and the lens assembly may include any one of the phase modulators according to one or more embodiments.

The power management module 2088 may manage power supplied to the electronic device 2001. The power management module 2088 may be implemented as a part of a power management integrated circuit (PMIC).

The battery 2089 may supply power to the constituent elements of the electronic device 2001. The battery 2089 may include non-rechargeable primary cells, rechargeable secondary cells, and/or fuel cells.

The communication module 2090 may establish a wired communication channel and/or a wireless communication channel between the electronic device 2001 and another electronic device (e.g., the electronic device 2002, the electronic device 2004, the server 2008, etc.), and support a communication through an established communication channel. The communication module 2090 may be operated independently of the processor 2020 (e.g., the application processor etc.), and may include one or a plurality of communication processors supporting a wired communication and/or a wireless communication. The communication module 2090 may include a wireless communication module 2092 (e.g., a cellular communication module, a short-range wireless communication module, a global navigation satellite system (GNSS) communication module, etc.), and/or a wired communication module 2094 (e.g., a local area network (LAN) communication module, a power line communication module, etc.). Among the above communication modules, a corresponding communication module may communicate with another electronic device through the first network 2098 (e.g., a short-range communication network such as Bluetooth, WiFi Direct, or infrared data association (IrDA)) or the second network 2099 (e.g., a long-range communication network such as a cellular network, the Internet, or a computer network (LAN, wide area network (WAN), etc.)). These various types of communication modules may be integrated into one constituent element (e.g., a single chip etc.), or may be implemented as a plurality of separate constituent elements (e.g., multiple chips). The wireless communication module 2092 may verify and authenticate the electronic device 2001 in a communication network such as the first network 2098 and/or the second network 2099 by using subscriber information (e.g., an international mobile subscriber identifier (IMSI), etc.) stored in the subscriber identification module 2096.

The antenna module 2097 may transmit signals and/or power to the outside (e.g., another electronic device, etc.) or receive signals and/or power from the outside. An antenna may include an emitter formed in a conductive pattern on a substrate (e.g., a printed circuit board (PCB) etc.). The antenna module 2097 may include one or a plurality of antennas. When the antenna module 2097 includes a plurality of antennas, the communication module 2090 may select, from among the antennas, an appropriate antenna for a communication method used in a communication network such as the first network 2098 and/or the second network 2099. Signals and/or power may be transmitted or received between the communication module 2090 and another electronic device through the selected antenna. Other parts (e.g., an RFIC, etc.) than the antenna may be included as a part of the antenna module 2097.

Some of the constituent elements may be connected to each other through a communication method between peripheral devices (e.g., a bus, general purpose input and output (GPIO), a serial peripheral interface (SPI), a mobile industry processor interface (MIPI), etc.) and may mutually exchange signals (e.g., commands, data, etc.).

The command or data may be transmitted or received between the electronic device 2001 and the external electronic device 2004 through the server 2008 connected to the second network 2099. The electronic devices 2002 and 2004 may be of a type that is the same as or different from the electronic device 2001. All or a part of operations executed in the electronic device 2001 may be executed in one or a plurality of the electronic devices (e.g., electronic devices 2002, 2004, and 2008). For example, when the electronic device 2001 needs to perform a function or service, the electronic device 2001 may request one or a plurality of electronic devices to perform part of the whole of the function or service, instead of performing the function or service. The one or a plurality of the electronic devices receiving the request may perform additional function or service related to the request, and transmit a result of the performance to the electronic device 2001. To this end, cloud computing, distributed computing, and/or client-server computing technology may be used.

According to one or more embodiments, the sensor system may have high selectivity and accuracy as the auxiliary sensor obtains information for control/calibration of a main sensor array.

In the sensor system and the electronic device including the same, according to one or more embodiment, by recalibrating the first sensor array based on information obtained by a second sensor, selectivity and accuracy to the gas mixture to be measured may be increased. Although the sensor system and the electronic device including the same are described with reference to the embodiments illustrated in the drawings, these are merely exemplary, and those skilled in the art to which the present disclosure pertains could make various modifications and changes from these descriptions.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A sensor system comprising:

a first sensor array comprising a plurality of first sensors having different sensitivities with respect to components of a gas mixture; and a second sensor comprising:

a plurality of electrodes configured to emit light;

an optical lens configured to collimate the light; and a spectroscope, wherein the second sensor is configured to generate a prediction value corresponding to the components of the gas mixture.

2. The sensor system of claim 1, wherein the sensor system comprises a first chamber and a second chamber, wherein the first sensor array is in the first chamber, wherein the plurality of electrodes are in the second chamber, and wherein the first chamber is connected in series to the second chamber.

3. The sensor system of claim 1, wherein the sensor system comprises a first chamber and a second chamber, wherein the first sensor array is in the first chamber, wherein the plurality of electrodes are in the second chamber, and wherein the first chamber is connected in parallel to the second chamber.

4. The sensor system of claim 1, wherein the sensor system comprises a first chamber, and wherein the first sensor array and the plurality of electrodes are provided in the first chamber.

5. The sensor system of claim 1, further comprising a nanogap between the plurality of electrodes.

6. The sensor system of claim 1, wherein the spectroscope comprises a plurality of pixels and a filter provided on the plurality of pixels.

7. The sensor system of claim 6, wherein the plurality of pixels comprise a complementary metal-oxide-semiconductor (CMOS) image sensor or a line array sensor.

8. The sensor system of claim 6, wherein the filter comprises a band pass filter.

9. The sensor system of claim 1, further comprising a concentrator configured to concentrate the gas mixture.

10. The sensor system of claim 1, further comprising a circuit portion configured to:

output analog signals of the first sensor array and the second sensor; and convert the analog signals into digital signals.

11. The sensor system of claim 1, wherein the prediction value corresponds to a type and concentration of the components of the gas mixture;

wherein the second sensor is configured to transmit the prediction value to the first sensor array, and wherein the first sensor array is configured to be recalibrated based on the prediction value.

12. The sensor system of claim 1, further comprising a controller configured to recalibrate the first sensor array based on the prediction value.

13. The sensor system of claim 12, wherein the controller is configured to recalibrate the first sensor array by at least one of:

adjusting a sensitivity and offset value of each of the plurality of first sensors, and updating a library of the components of the gas mixture.

14. A sensor system comprising:

a first chamber;

a second chamber;

a first sensor array comprising a plurality of first sensors having different sensitivities with respect to components of a gas mixture; and a second sensor comprising:

a first electrode in the second chamber;

a second electrode outside the second chamber; and a spectroscope, wherein the second sensor is configured to generate a prediction value corresponding to the components of the gas mixture, and wherein the first sensor array is configured to be recalibrated based on the prediction value.

15. The sensor system of claim 14, wherein the first sensor array is in the first chamber, and wherein the first chamber is connected in series to the second chamber.

16. The sensor system of claim 14, wherein the first sensor array is in the first chamber, and wherein the first chamber is connected in parallel to the second chamber.

17. The sensor system of claim 14, wherein the prediction value corresponds to a type and concentration of the components of the gas mixture, and wherein the second sensor is configured to transmit the prediction value to the first sensor array such that the first sensor array is recalibrated based on the transmitted prediction value.

18. The sensor system of claim 14, further comprising a controller configured to recalibrate the first sensor array based on the prediction value by at least one of:

adjusting a sensitivity and offset value of each of the plurality of first sensors, and updating a library of the components of the gas mixture.

19. The sensor system of claim 14, further comprising a concentrator configured to concentrate the gas mixture.

20. A method of operating a sensor system comprising a first chamber in which a first sensor array is provided and a second chamber in which a second sensor is provided, the method comprising:

injecting a gas mixture into the second chamber;

generating light by applying a voltage to electrodes of the second sensor;

generating a prediction value corresponding to components and concentration of the gas mixture by measuring a spectrum of the generated light; and recalibrating the first sensor array based on the generated prediction value.

* * * * *